US012689087B2

(12) United States Patent
Park et al.

(10) Patent No.: US 12,689,087 B2
(45) Date of Patent: Jul. 21, 2026

(54) BATTERY PACK CASE HAVING NONUNIFORM THICKNESS

(71) Applicant: LG ENERGY SOLUTION, LTD., Seoul (KR)

(72) Inventors: Jin Woo Park, Daejeon (KR); Bok Gun Lee, Daejeon (KR); Tae Geun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 621 days.

(21) Appl. No.: 18/027,058

(22) PCT Filed: Jun. 16, 2022

(86) PCT No.: PCT/KR2022/008518
§ 371 (c)(1),
(2) Date: Mar. 17, 2023

(87) PCT Pub. No.: WO2022/265418
PCT Pub. Date: Dec. 22, 2022

(65) Prior Publication Data
US 2023/0327263 A1 Oct. 12, 2023

(30) Foreign Application Priority Data

Jun. 16, 2021 (KR) ........................ 10-2021-0077819

(51) Int. Cl.
*H01M 50/262* (2021.01)
*H01M 50/211* (2021.01)
*H01M 50/227* (2021.01)

(52) U.S. Cl.
CPC ....... *H01M 50/262* (2021.01); *H01M 50/211* (2021.01); *H01M 50/227* (2021.01)

(58) Field of Classification Search
None
See application file for complete search history.

(56) References Cited

U.S. PATENT DOCUMENTS 6,258,480 B1 7/2001 Moriwaki et al.
7,597,994 B2 10/2009 Kozu et al.
(Continued)

FOREIGN PATENT DOCUMENTS

CN 101154719 A 4/2008
CN 102265445 A 11/2011
(Continued)

OTHER PUBLICATIONS

Extended European Search Report for European Application No. 22825341.5, dated Feb. 9, 2024.
(Continued)

*Primary Examiner* — Wyatt P Mcconnell
(74) *Attorney, Agent, or Firm* — Birch, Stewart, Kolasch & Birch, LLP

(57) ABSTRACT

Discussed is battery pack case configured to receive a battery cell stack constituted by a plurality of battery cells stacked therein, the battery pack case including a first case configured to allow the battery cell stack to be mounted therein and a second case coupled to the first case, the second case being configured to cover the battery cell stack, wherein the first case includes a first flat panel portion and a first side portion, wherein the second case includes a second flat panel portion and a second side portion, and wherein a thickness of the second flat panel portion of the second case is less than the thickness of the second side portion of the second case.

16 Claims, 6 Drawing Sheets

(56) References Cited

U.S. PATENT DOCUMENTS

| | | | |
|---|---|---|---|
| 7,989,102 | B2 | 8/2011 | Fukusako et al. |
| 10,665,830 | B2 | 5/2020 | Yang et al. |
| 2005/0164080 | A1 | 7/2005 | Kozu et al. |
| 2008/0081254 | A1* | 4/2008 | Kim ............... H01M 10/425 |
| | | | 429/163 |
| 2008/0096072 | A1 | 4/2008 | Fukusako et al. |
| 2011/0135997 | A1 | 6/2011 | Watanabe et al. |
| 2011/0143193 | A1 | 6/2011 | Ahn |
| 2013/0252058 | A1 | 9/2013 | Kim |
| 2015/0188203 | A1 | 7/2015 | Enomoto et al. |
| 2017/0237045 | A1 | 8/2017 | Kim et al. |
| 2017/0358785 | A1* | 12/2017 | Hattori ............... H01M 50/264 |
| 2018/0287102 | A1 | 10/2018 | Ullmann |
| 2018/0304504 | A1 | 10/2018 | Lee |
| 2019/0006644 | A1 | 1/2019 | Sakurai |
| 2020/0168855 | A1 | 5/2020 | Hwang et al. |
| 2021/0013562 | A1* | 1/2021 | Sakurai ............... H01M 10/625 |
| 2021/0013565 | A1 | 1/2021 | Pucher et al. |
| 2022/0166084 | A1 | 5/2022 | Park et al. |
| 2022/0166098 | A1 | 5/2022 | Choi et al. |
| 2022/0231372 | A1 | 7/2022 | Kim |

FOREIGN PATENT DOCUMENTS

| | | | |
|---|---|---|---|
| CN | 105470413 | A | 4/2016 |
| CN | 205376601 | U | 7/2016 |
| CN | 111937223 | A | 11/2020 |
| EP | 2 333 889 | A1 | 6/2011 |
| JP | 2003-234096 | A | 8/2003 |
| JP | 2008-84814 | A | 4/2008 |
| JP | 2010-108734 | A | 5/2010 |
| JP | 2011-124204 | A | 6/2011 |
| JP | 2013-145717 | A | 7/2013 |
| JP | 2019-9086 | A | 1/2019 |
| JP | 2021-15686 | A | 2/2021 |
| KR | 2000-0020533 | A | 4/2000 |
| KR | 10-2000-0068921 | A | 11/2000 |
| KR | 10-2017-0030954 | A | 3/2017 |
| KR | 10-2017-0092246 | A | 8/2017 |
| KR | 10-2018-0040574 | A | 4/2018 |
| KR | 10-2019-0048592 | A | 5/2019 |
| KR | 10-2020-0077296 | A | 6/2020 |
| KR | 10-2120933 | B1 | 6/2020 |
| KR | 10-2021-0009914 | A | 1/2021 |
| KR | 10-2021-0010345 | A | 1/2021 |
| WO | WO 2014/045628 | A1 | 3/2014 |

OTHER PUBLICATIONS

International Search Report for PCT/KR2022/008518 (PCT/ISA/210) mailed on Sep. 29, 2022.

* cited by examiner

【FIG. 1】
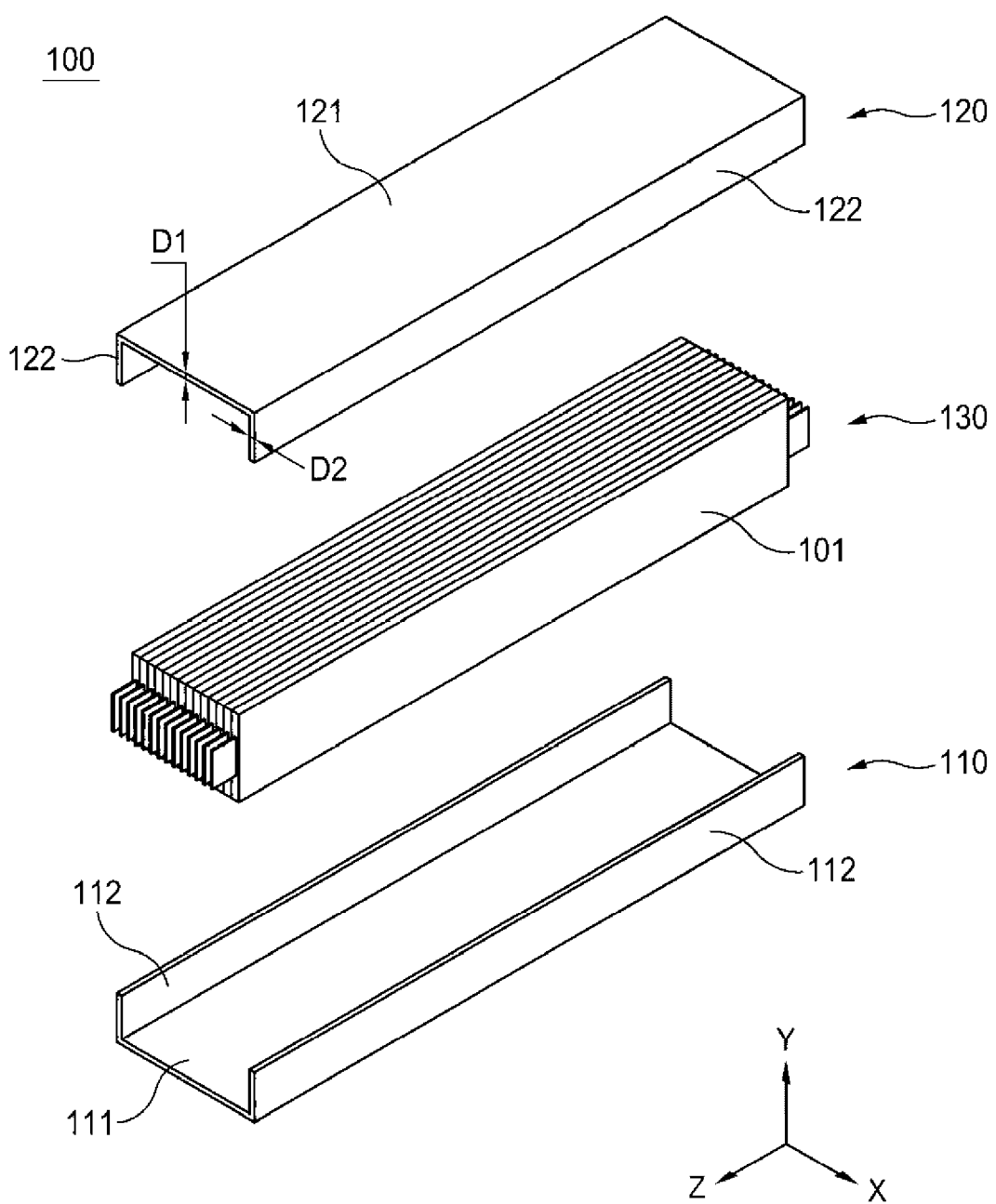

【FIG. 2(A)】
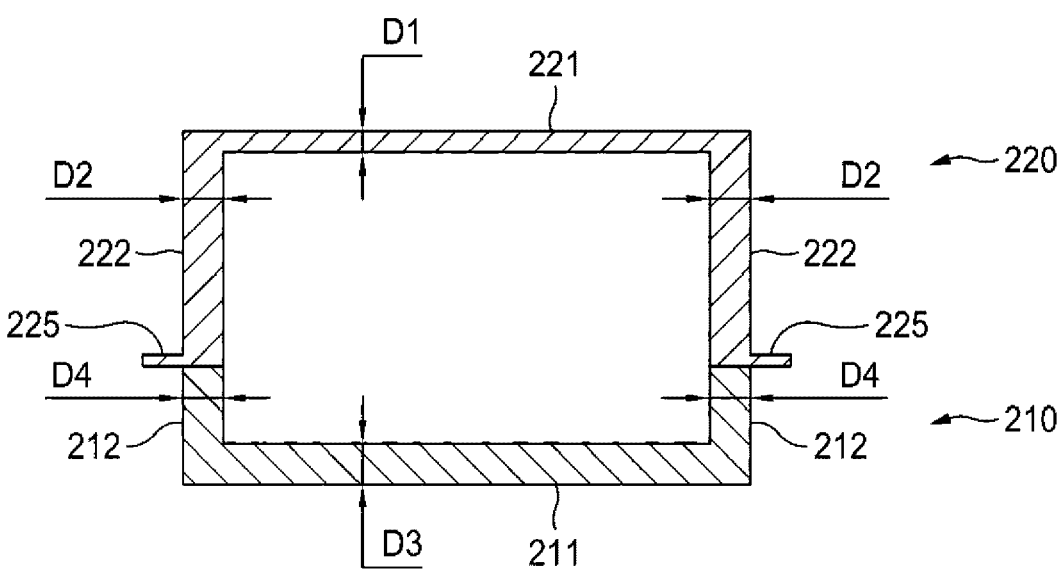
【FIG. 2(B)】
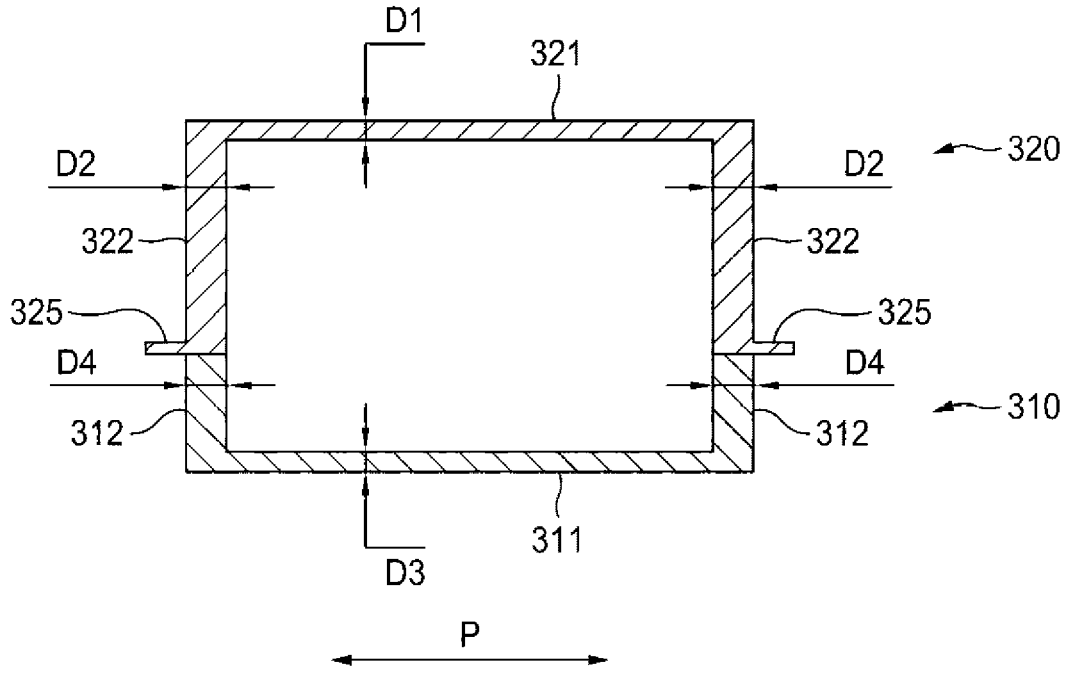

【FIG. 3(A)】
400
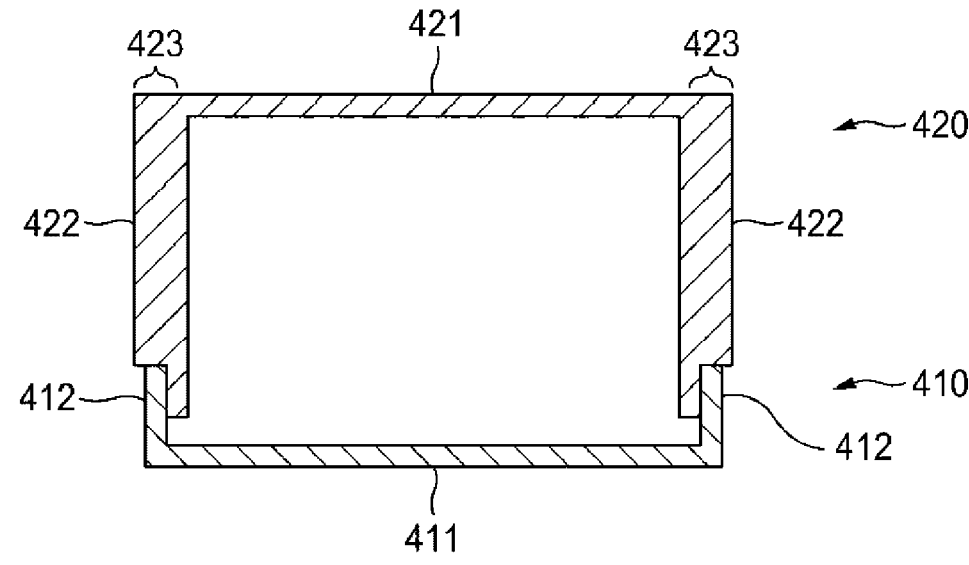
【FIG. 3(B)】
500
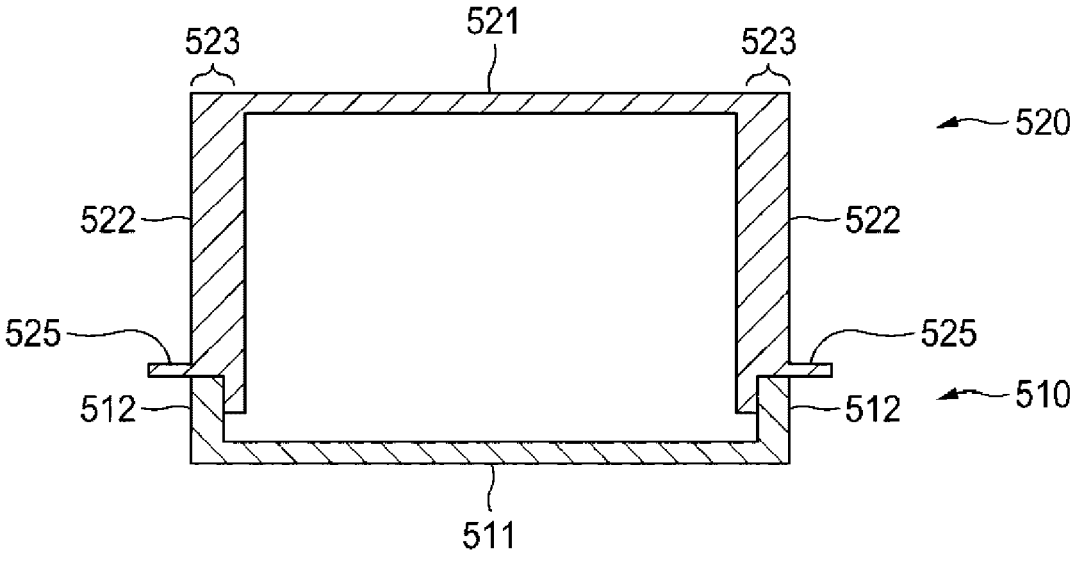

【FIG. 4】
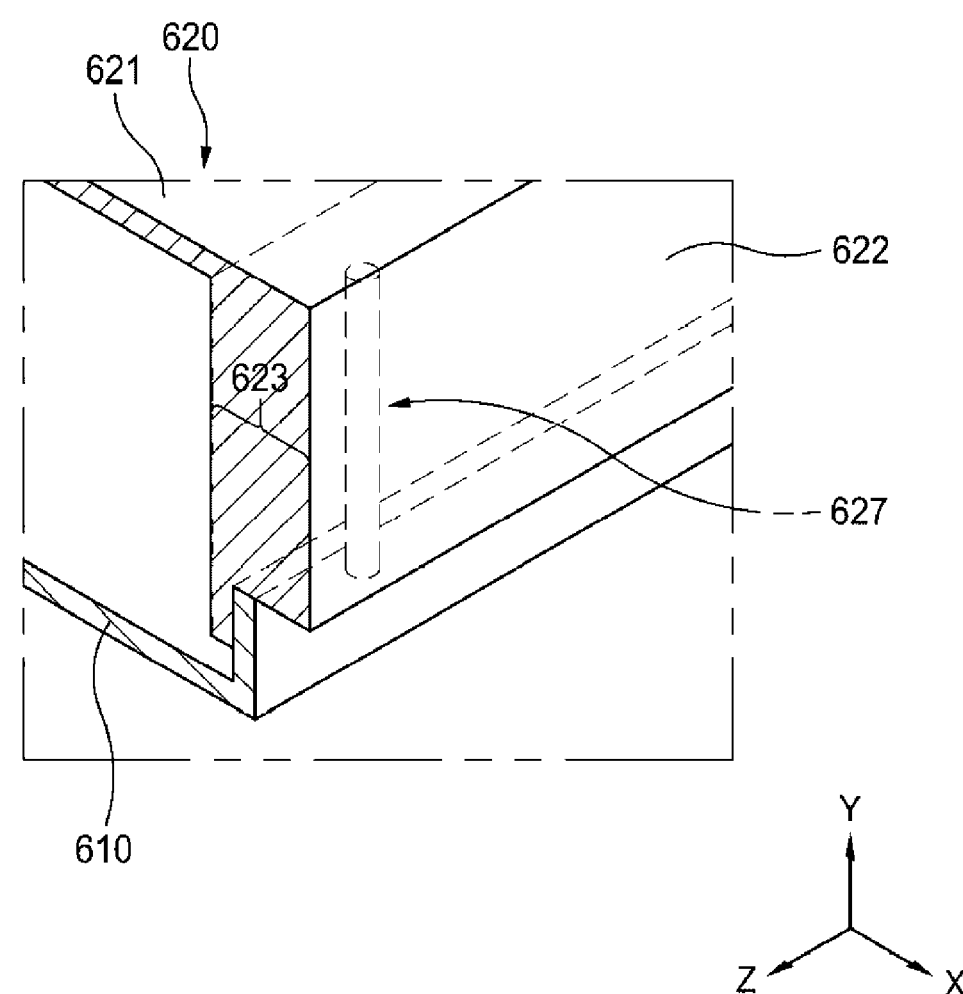

【FIG. 5】
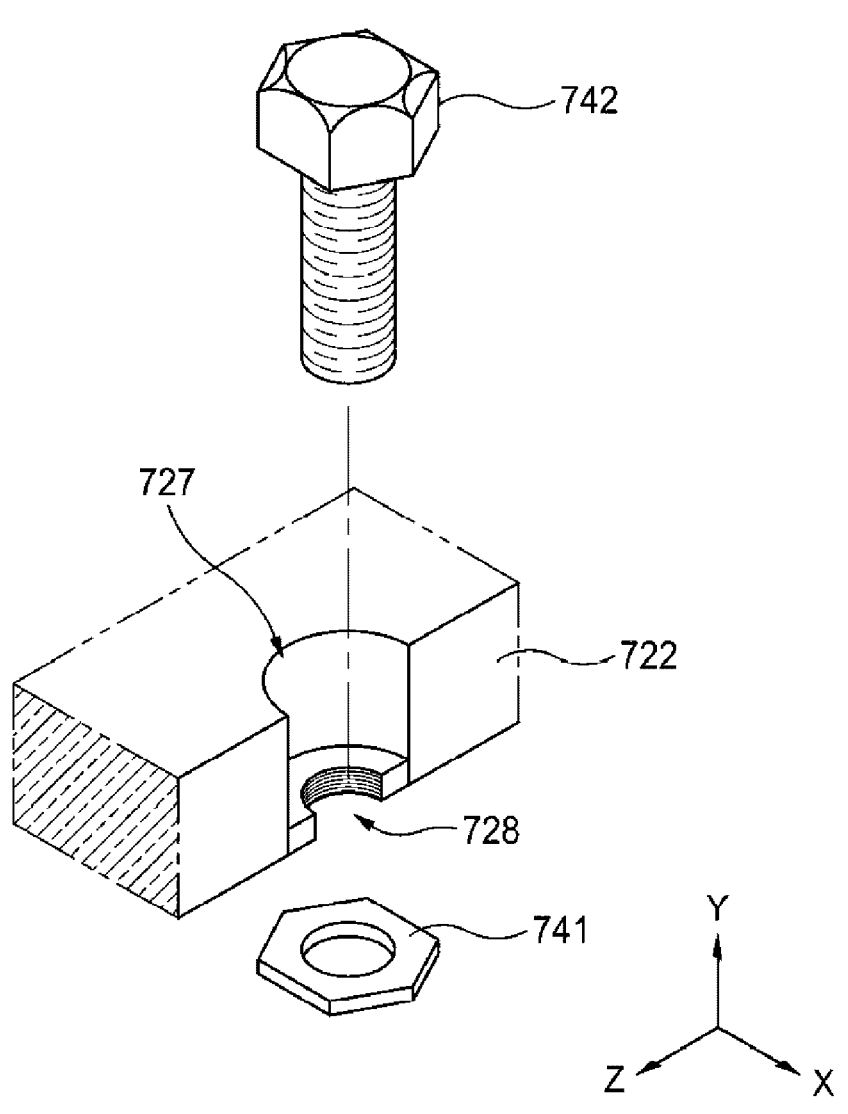

【FIG. 6】
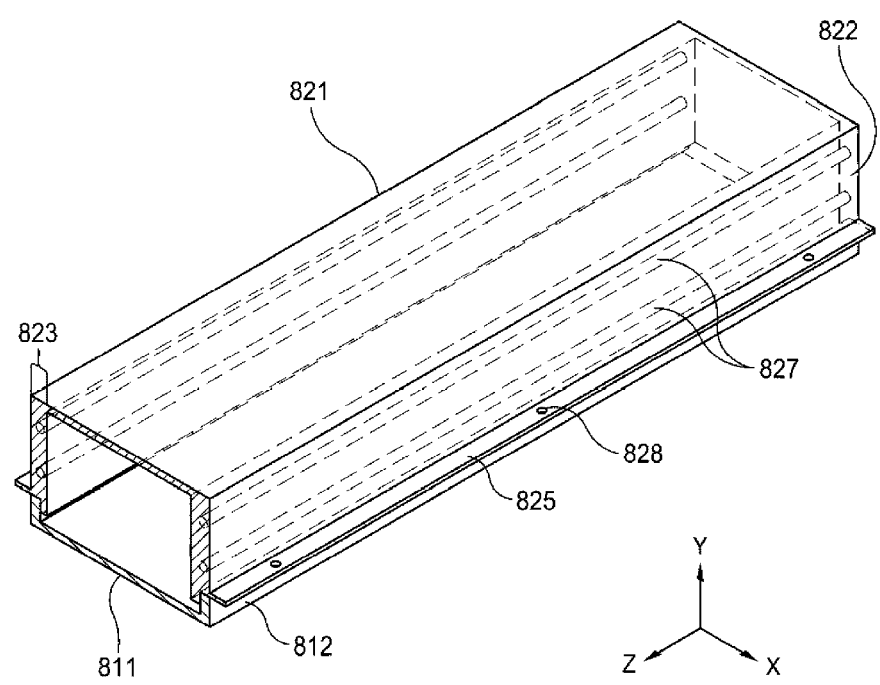
【FIG. 7】
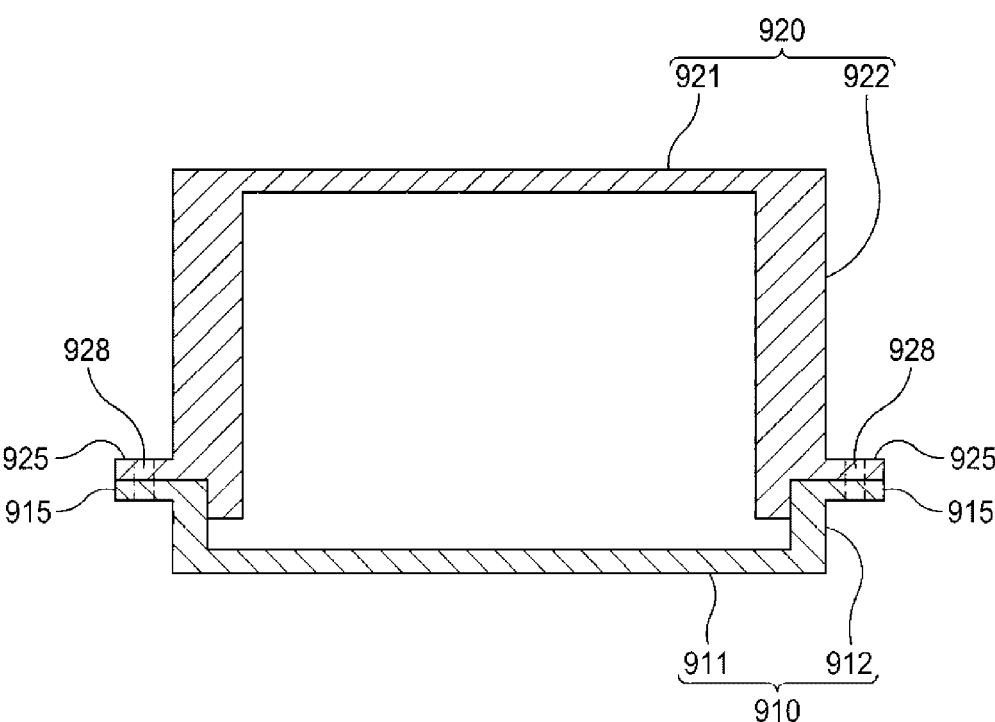

BATTERY PACK CASE HAVING NONUNIFORM THICKNESS

TECHNICAL FIELD

This application claims the benefit of priority to Korean Patent Application No. 2021-0077819 filed on Jun. 16, 2021, the disclosure of which is incorporated herein by reference in its entirety.

The present invention relates to a battery pack case having a nonuniform thickness. More particularly, the present invention relates to a battery pack case formed so as to have a difference in thickness depending on position of the battery pack case in order to prevent change in shape of a battery pack due to swelling of a battery cell.

BACKGROUND ART

As exhaust gas discharged from vehicles using fuels, such as gasoline or diesel, was marked as a cause of fine dust and air pollution, a lithium secondary battery configured to be charged and discharged due to movement of lithium ions between a positive electrode and a negative electrode has attracted attention as an alternative fuel thereto.

The lithium secondary battery may use a plurality of battery cells connected to each other in series or in parallel depending on the shape of a device to which the lithium secondary battery is applied, the capacity of the battery, and the output of the battery. The plurality of battery cells connected to each other in series or in parallel may be mounted in a battery pack case together with a member, such as a battery management system (BMS), to constitute a battery pack.

In order to manufacture the battery pack case, a pressing method of pressing a metal sheet using a press so as to be shaped may be used. In this case, a metal sheet having a uniform thickness may be bent to manufacture the battery pack case, and the thickness of the shaped battery pack case may be uniform over the entirety of the battery pack case.

In general, a battery cell swells due to expansion and contraction thereof in a direction perpendicular to an electrode plate. Pressure due to such swelling is applied to the plane of a battery pack case parallel to the plane of the electrode plate, whereby change in volume may occur; however, no change in volume occurs at the other parts of the battery pack case.

That is, it is not necessary for a part of the outer surface of the battery pack case having little swelling to be formed thick. Since a battery pack case manufactured using a pressing method, as in the conventional art, is manufactured by bending a metal sheet, however, there is no choice but to manufacture a battery pack case having a uniform thickness.

When the thickness of the part of the battery pack case that is not greatly changed in volume is decreased, however, it is possible to reduce the weight of the battery pack case and to increase utilization of an inner space of the battery pack case. Consequently, it is necessary to form the battery pack case so as to have different thicknesses depending on position of the battery pack case.

In addition, when laser welding is used in order to couple a top plate to a U-frame manufactured using a pressing method, welding is difficult if a gap is generated between the two parts, and therefore precise tolerance management is necessary.

In connection therewith, a battery pack housing according to Patent Document 1 includes a mono-frame type frame main body configured to receive a battery cell or a battery module therein, the frame main body includes a first surface that faces a flat outer surface of the battery cell or the battery module and a second surface that faces a side surface of the battery cell or the battery module, the first surface and the second surface are connected to each other via a curved connection portion, and the connection portion has a part thicker than the thickness of the first surface or the second surface.

Patent Document 1 discloses a structure in which the connection portion thicker than the thickness of each of the first surface and the second surface is included in order to prevent deformation of a battery pack due to swelling of the battery cell and to improve dimensional stability of the battery pack. However, the thicknesses of the first surface and the second surface of the frame main body are uniform, and therefore the thickness of a part of the battery pack case that has small change in volume and the thickness of a part of the battery pack case that has large change in volume are the same.

Patent document 2 discloses a battery module configured such that a module frame configured to receive a battery cell stack includes a first module frame open at an upper part thereof and a second module frame open at a lower part thereof and such that a side portion of the first module frame and a side portion of the second module frame are coupled to each other while enveloping the battery cell stack so as to overlap each other.

In Patent document 2, the side portions of the first module frame and the second module frame are coupled to each other so as to overlap each other in order to secure rigidity at side surfaces thereof; however, ends of the side surfaces of the second module frame are coupled to lower corners of the first module frame by welding. Patent document 2 does not define the welding method. When laser welding is performed, however, strict tolerance management is required. When welding is performed using other different methods, a bead may be generated, whereby a part protruding to the outside of the battery pack case may be formed, and therefore it may be difficult to secure dimensional stability.

Consequently, there is a need for battery pack case manufacturing technology capable of not affecting productivity even though precise tolerance management is performed while securing dimensional stability by preventing change in volume due to swelling caused by charging and discharging of a plurality of battery cells.

PRIOR ART DOCUMENTS (Patent Document 1) Korean Patent Application Publication No. 2020-0077296
(Patent Document 2) Korean Patent Application Publication No. 2021-0010345
(Patent Document 3) Japanese Patent Application Publication No. 2013-145717

DISCLOSURE

Technical Problem

The present invention has been made in view of the above problems, and it is an object of the present invention to provide a battery pack case configured such that a part of a battery pack that may have large change in volume is formed so as to be thick and the other parts are formed so as to have a relatively small thickness, whereby the battery pack case has a nonuniform thickness in order to minimize an increase in weight of the battery pack while preventing change in shape of the battery pack.

Technical Solution

A battery pack case according to the present invention to accomplish the above object is a battery pack case configured to receive a battery cell stack constituted by a plurality of battery cells stacked therein, the battery pack case including a first case configured to allow the battery cell stack to be mounted therein and a second case coupled to the first case, the second case being configured to cover the battery cell stack, wherein the first case includes a first flat panel portion and a first side portion, wherein the second case includes a second flat panel portion and a second side portion, and wherein the thickness of the second flat panel portion of the second case is less than the thickness of the second side portion of the second case.

The first case may include two first side portions extending, in a direction perpendicular to the first flat panel portion, and from opposite outer peripheries of the first flat panel portion in a longitudinal direction thereof, and wherein the second case may include two second side portions extending, in a direction perpendicular to the second flat panel portion, and from opposite outer peripheries of the second flat panel portion in a longitudinal direction thereof.

The second case may include a flange portion being an end of each of the second side portions extending from the second flat panel portion and bent in a direction toward an outside of the second case, and wherein the flange portion may be coupled to an end of a corresponding one of the first side portions of the first case.

Each of the second side portions may be configured to have a structure including a step at an outer surface of the second side portion such that a thickness of an end thereof is reduced, wherein the end of each of the second side portions may be inserted into an inside of a corresponding one of the first side portions, and a stepped portion of each of the second side portions having a large thickness may be seated on an end of a corresponding one of the first side portions so as to be coupled thereto.

The stepped portion of each of the second side portions may include a vertical hole formed therethrough in a height direction thereof.

A screw hole may be formed in the vertical hole, the screw hole being configured such that the inner diameter of the screw hole is less than the inner diameter of the vertical hole and the height of the screw hole is less than the height of the vertical hole.

The stepped portion of each of the second side portions may include a horizontal hole formed therethrough in a horizontal direction thereof.

The height of each of the second side portions may be greater than the height of a corresponding one of the first side portions.

The thickness of the first flat panel portion of the first case may be less than the thickness of each of the first side portions of the first case.

The first case may include a flange portion formed as the result of the end of each of the first side portions extending from the first flat panel portion being bent in a direction toward an outside of the first case, wherein a thickness of the first flat panel portion of the first case may be less than a thickness of each of the first side portions of the first case, and wherein a screw hole may be formed through the flange portion of the first case and the flange portion of the second case.

The second case may include a thermoplastic resin.

In addition, the present invention provides a battery pack including the battery pack case wherein the plurality of battery cells are received in the battery pack case, and wherein electrode plates of the plurality of battery cells are disposed so as to face the first side portions and the second side portions.

In addition, the present invention may provide various combinations of the above solving means.

Advantageous Effects

As is apparent from the above description, a battery pack case according to the present invention may be manufactured through an extrusion molding method using a mold having a desired shape, and therefore it is possible to manufacture a battery pack case configured such that thickness deviation occurs depending on position thereof.

That is, a part of the battery pack case located so as to face a swelling surface of a battery cell may be formed so as to have a relatively large thickness, whereby it is possible to minimize change in volume of the battery pack case, and a part of the battery pack case located so as not to face the swelling surface of the battery cell may be formed so as to have a relatively small thickness, whereby it is possible to reduce the overall weight of the battery pack case and to reduce production cost of the battery pack case.

In addition, the size of the battery cell may be increased by the reduced thickness of the battery pack case, whereby it is possible to increase the capacity of a battery pack.

In addition, a welding method other than laser welding may be used, whereby accurate tolerance management is unnecessary, and therefore productivity may be improved. Furthermore, even when a bead is formed due to welding, the battery pack case is shaped to have a structure in which the bead does not protrude, whereby it is possible to implement a structure in which the bead does not affect the dimensions of the battery pack case.

DESCRIPTION OF DRAWINGS

FIG. 1 is an exploded perspective view of a battery pack case according to a first embodiment and a battery cell stack.

FIG. 2(A) is a vertical sectional view of a battery pack case according to a second embodiment and FIG. 2(B) is a vertical sectional view of a battery pack case according to a third embodiment.

FIG. 3(A) is a vertical sectional view of a battery pack case according to a fourth embodiment and FIG. 3(B) is a vertical sectional view of a battery pack case according to a fifth embodiment.

FIG. 4 is a partial perspective view of a battery pack case according to a sixth embodiment.

FIG. 5 is a partial perspective view of a battery pack case according to a seventh embodiment.

FIG. 6 is a perspective view of a battery pack case according to an eighth embodiment.

FIG. 7 is a vertical sectional view of a battery pack case according to a ninth embodiment.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 1 is an exploded perspective view of a battery pack case according to a first embodiment and a battery cell stack.

Referring to FIG. 1, the battery pack case 100 includes a first case 110 and a second case 120 configured to receive a battery cell stack 130 constituted by a plurality of battery cells 101 stacked in tight contact with each other therein.

A pouch-shaped battery cell may be used as the battery cell 101, and a unidirectional battery cell configured such that a positive electrode terminal and a negative electrode terminal protrude in the same direction as well as a bidirectional battery cell configured such that a positive electrode terminal and a negative electrode terminal protrude in opposite directions, as shown in FIG. 1, may be used.

The pouch-shaped battery cell may be manufactured by receiving an electrode assembly and an electrolytic solution in a pouch-shaped battery case formed by shaping a laminate sheet including a metal layer and a resin layer and hermetically sealing the pouch-shaped battery case.

Alternatively, the battery cell 101 may be a prismatic battery cell or a cylindrical battery cell.

The electrode assembly may be at least one selected from the group consisting of a stacked type electrode assembly, in which a positive electrode and a negative electrode are stacked in the state in which a separator is interposed therebetween, a stacked and folded type electrode assembly, in which a long separator sheet is wound in the state in which monocells each constituted by a positive electrode, a separator, and a negative electrode stacked and/or bi-cells each constituted by a positive electrode, a separator, a negative electrode, a separator, and a positive electrode stacked or by a negative electrode, a separator, a positive electrode, a separator, and a negative electrode stacked are disposed on the separator sheet, a laminated and stacked type electrode assembly, in which the monocell and the bi-cell are stacked in the state in which a separator is disposed therebetween, and a jelly-roll type electrode assembly, in which a positive electrode sheet and a negative electrode sheet are wound in the state in which separator sheets are disposed therebetween and at the outsides thereof.

Each of the first case 110 and the second case has a U-shaped frame structure, wherein the battery cell stack 130 is mounted to an upper surface of the first case 110 and the second case 120 is coupled to the first case 110 while covering the battery cell stack 130.

The first case 110 includes a first flat panel portion 111 configured to face a lower surface of the battery cell stack 130 and a first side portion 112 configured to face a side surface of the battery cell stack 130, and the second case 120 includes a second flat panel portion 121 configured to face an upper surface of the battery cell stack 130 and a second side portion 122 configured to face the side surface of the battery cell stack 130.

That is, electrode plates of the plurality of battery cells 101 are disposed so as to face the first side portion 112 and the second side portion 122, and the first side portion 112 and the second side portion 122 are disposed so as to face swelling surfaces of the battery cells that swell. Consequently, each of the first side portion 112 and the second side portion 122 may be formed so as to have a relatively large thickness, whereby the rigidity thereof may be secured.

When the battery cell 101 is a prismatic battery cell, electrode plates may be disposed so as to face the first side portion 112 and the second side portion 122, as in the pouch-shaped battery cell. When the battery cell is a cylindrical battery cell, a top cap may be disposed so as to face the first flat panel portion of the first case or the second flat panel portion of the second case.

The second case may be made of a thermoplastic resin. For example, a polyolefin-based resin, such as polyethylene, polypropylene, polybutene, or polyisoprene, polyethylene terephthalate, polyvinyl chloride, polyvinylidene chloride, polystyrene, acrylic acid, acrylic acid ester, polycarbonate, polyoxymethylene, polyester, or polyamide may be used.

The second case may be manufactured using an extrusion molding method of introducing a plasticized resin into an extruder and pushing the plasticized resin into a mold so as to be shaped, and the second flat panel portion and the second side portion may be formed so as to have different thicknesses.

Specifically, the second case 120 may be formed so as to have a structure in which the thickness D1 of the second flat panel portion 121 is less than the thickness D2 of the second side portion 122.

In addition, when the second case is manufactured using the extrusion molding method, design of the mold may be changed in order to various configure the shape of the second side portion, as will be described below.

Since the thickness of the second side portion 122 disposed perpendicular to a swelling direction x of the battery cell is formed so as to be greater than the thickness of the second flat panel portion 121, as described above, it is possible to prevent an increase in volume of the battery pack case due to swelling of the battery cell.

In addition, since the second flat panel portion 121, which is not affected by swelling of the battery cell, is formed so as to have a smaller thickness than the second side portion 122, it is possible to reduce the weight of the second case 120 and to increase the volume of the battery cell stack 130 by the reduced thickness of the second flat panel portion 121, whereby it is possible to increase the capacity of the battery pack.

In the battery pack case 100, the first case 110 includes two first side portions 112 extending, in a direction y perpendicular to the first flat panel portion 111, from opposite outer peripheries of the first flat panel portion 111 in a longitudinal direction z, and the second case 120 includes two second side portions 122 extending, in a direction y perpendicular to the second flat panel portion 121, from opposite outer peripheries of the second flat panel portion 121 in a longitudinal direction z.

The first flat panel portion 111 and the second flat panel portion 121 may have the same area, the length of the first side portion 112 in the direction y may be equal to, less than, or greater than the length of the second side portion 122 in the direction y.

FIG. 2(A) is a vertical sectional view of a battery pack case according to a second embodiment and FIG. 2(B) is a vertical sectional view of a battery pack case according to a third embodiment.

Referring to FIG. 2(A) or FIG. 2(B), a second case 220 or 320 of the battery pack case 200 or the battery pack case 300 includes a flange portion 225 or 325 formed as the result of the end of a second side portion 222 or 322 extending from a second flat panel portion 221 or 321 being bent in a direction toward the outside of the second case 220 or 320, wherein the flange portion 225 or 325 is coupled to an upper end of a first side portion 212 or 312 of a first case 210 or 310.

The flange portion 225 or 325 is a portion configured to allow the battery pack case 200 or the battery pack case 300 to be mounted to a device therethrough, and the battery pack case may be mounted to the device through the flange portion in the state in which the first case and the second case are coupled to each other.

The second case 220 or 320, which is formed by extrusion-molding a thermoplastic material, may be configured such that the thickness D1 of the second flat panel portion 221 or 321 is less than the thickness D1 of the second side portion 222 or 322.

Since the thickness of the second side portion 222 or 322 disposed perpendicular to a swelling direction P of the battery cell is formed so as to have a larger thickness, as described above, it is possible to prevent change in external shape of the battery pack case when the battery cell swells.

In addition, since the second flat panel portion 221 or 321, which is not affected by swelling of the battery cell, is formed so as to have a smaller thickness than the second side portion 222 or 322, it is possible to reduce the weight of the battery pack case and to increase the volume of the battery cell stack by the reduced thickness of the second flat panel portion 221 or 321, whereby it is possible to increase the capacity of the battery.

As in the battery pack case 200 according to the second embodiment, the thickness D3 of a first flat panel portion 211 may be equal to the thickness D4 of the first side portion 212. The first case 210 having an overall uniform thickness, as described above, may be manufactured using a method of bending and shaping a panel, or may be manufactured using an extrusion molding method.

As in the battery pack case 300 according to the third embodiment, the thickness D3 of a first flat panel portion 311 may be less than the thickness D4 of the first side portion 312. The first case 310 having a nonuniform thickness, as described above, may be manufactured using an extrusion molding method, like the second case 320.

The flange portion 225 or 325 and the end of the first side portion 212 or 312 may be coupled to each other by welding. When laser welding is used, the flange portion and the end of the first side portion must be coupled to each other in tight contact with each other. When the battery pack case is manufactured using an extrusion molding method, as in the present invention, it is possible to form the battery pack case so as to have a uniform size and shape, whereby dimensional stability may be improved. When the battery pack case according to the present invention is used, therefore, it is possible to uniformly form the structure in which the flange portion and the end of the first side portion are in tight contact with each other, and laser welding may be used in order to achieve coupling therebetween, whereby weldability may be secured.

Alternatively, when a welding method other than laser welding, such as ultrasonic welding, is used, a bead may be generated. Since a lower part of the flange portion 225 or 325 and the upper end of the first side portion 212 or 312 are coupled to each other, however, the bead does not protrude farther than the flange portion. Consequently, the external dimensions of the battery pack are not affected even though the bead is formed.

FIG. 3(A) is a vertical sectional view of a battery pack case according to a fourth embodiment and FIG. 3(B) is a vertical sectional view of a battery pack case according to a fifth embodiment.

Referring to FIG. 3(A) or FIG. 3(B), the battery pack case 400 according to the fourth embodiment or the battery pack case 500 according to the fifth embodiment is configured to have a structure in which a step is formed at an outer surface of a second side portion 422 or 522 such that the thickness of a lower end thereof is reduced.

That is, the second side portion 422 or 522 includes a stepped portion 423 or 523 having a large thickness and a second side portion 422 or 522 having a small thickness, the second side portion 422 or 522 being inserted into a first case 410 or 510.

The end of the second side portion 422 or 522 is inserted into the inside of a first side portion 412 or 512, and the stepped portion 423 or 523 having the large thickness is seated on an upper end of the first side portion 412 or 512, whereby the first case 410 or 510 is coupled to a second case 420 or 520.

In the battery pack case 400 according to the fourth embodiment, the second case 420 is provided with no flange portion, and the first case 410 is configured such that the thickness of a first flat panel portion 411 is less than the thickness of the first side portion 412. In the battery pack case 500 according to the fifth embodiment, the second case 520 is provided with a flange portion 525, and the first case 510 is configured such that the thickness of a first flat panel portion 511 is less than the thickness of the first side portion 512.

The second case 420 or 520 is configured such that the thickness of a second flat panel portion 421 or 521 is less than the thickness of the second side portion 422 or 522.

FIG. 4 is a partial perspective view of a battery pack case according to a sixth embodiment.

Referring to FIG. 4, a first case 610 and a second case 620 of the battery pack case 600 according to the sixth embodiment may have the same structure as in the battery pack case 400 according to the fourth embodiment shown in FIG. 3. Additionally, a vertical hole 627 is formed through a stepped portion 623 of a second side portion 622 in a height direction y.

As a structure that reinforces the rigidity of the battery pack case in order to prevent change in external shape of the battery pack case due to swelling of a battery cell stack, the thickness of the second side portion 622 may be formed so as to be greater than the thickness of a second flat panel portion 621; however, the overall weight of the battery pack case is increased due thereto. Consequently, it is possible to implement a structure capable of minimizing an increase in weight of the battery pack case while reinforcing the rigidity thereof by forming the vertical hole 627 in the second side portion 622, as in the battery pack case 600 according to the sixth embodiment.

FIG. 5 is a partial perspective view of a battery pack case according to a seventh embodiment.

Referring to FIG. 5, there is shown a structure in which a vertical hole 727 is formed in the battery pack case according to the seventh embodiment, as in the battery pack case 600 according to the sixth embodiment shown in FIG. 4, and a screw hole 728 is formed in the vertical hole 727.

The inner diameter of the screw hole 728 is less than the inner diameter of the vertical hole 727, and the height of the screw hole 728 is less than the height of the vertical hole 727.

A nut 741 may be fastened to a bolt 742 inserted into the screw hole 728, whereby the battery pack case may be mounted to a device.

The battery pack case 600 according to the sixth embodiment has a structure in which the vertical hole 627 has a depth corresponding to the height of the stepped portion and a long bolt is inserted into the vertical hole 627 to mount the battery pack case 600 to a device.

In the battery pack case according to the seventh embodiment, the screw hole 728 is further formed, wherein the interior of the vertical hole 727 above the bolt 742 remains as an empty space in the state in which the bolt 742 is fastened. Consequently, the seventh embodiment may be a detailed illustration of a structure capable of obtaining an effect of minimizing an increase in weight of a second side portion 722 while reinforcing the rigidity thereof.

The structure of the vertical hole 627 formed in the battery pack case 600 according to the sixth embodiment or the structure of the vertical hole 727 and the screw hole 728 formed in the battery pack case according to the seventh embodiment may be equally applied to the battery pack case according to each of the second, third, and fifth embodiments, in which the flange portion is formed.

FIG. 6 is a perspective view of a battery pack case according to an eighth embodiment.

Referring to FIG. 6, in the battery pack case according to the eighth embodiment, a horizontal hole 827 is formed through a stepped portion 823 of a second side portion 822 in a horizontal direction z. The battery pack is mounted to a device in the state in which the horizontal hole 827 is empty, thereby achieving an effect of reducing the weight of a battery pack.

In addition, the second side portion 822 includes a flange portion 825, wherein a screw hole 828 is formed in the flange portion 825, and the screw hole 828 may be a bolt coupling portion configured to allow a nut to be fastened to a bolt in order to mount and fix the battery pack case to the device.

The thicknesses of a first flat panel portion 811 and a first side portion 812 of a first case may be applied, as in the second embodiment or the third embodiment shown in FIG. 2.

In a second case, a second flat panel portion 821 is formed so as to have a thickness less than the thickness of the second side portion 822.

FIG. 7 is a vertical sectional view of a battery pack case according to a ninth embodiment.

Referring to FIG. 7, a first case 910 of the battery pack case 900 according to the ninth embodiment includes a flange portion 915 formed as the result of the end of a first side portion 912 extending from a first flat panel portion 911 being bent in a direction toward the outside of the first case 910, and a second case 920 includes a flange portion 925 formed as the result of the end of a second side portion 922 extending from a second flat panel portion 921 being bent in a direction toward the outside of the second case 920.

The first case 910 has a structure in which the thickness of the first flat panel portion 911 is less than the thickness of the first side portion 912, and the second case 920 has a structure in which the thickness of the second flat panel portion 921 is less than the thickness of the second side portion 922.

The first case 910 and the second case 920 are coupled to each other by welding between the flange portions thereof.

A screw hole 928 is formed through the flange portion 915 of the first case 910 and the flange portion 925 of the second case 920, wherein a bolt may be coupled to the screw hole 928, whereby the battery pack case 900 may be mounted to a device.

As described above, the battery pack case according to the present invention is made of a thermoplastic resin, and is manufactured using a method of injecting the thermoplastic resin into a mold and extruding the thermoplastic resin. Consequently, a portion of the battery pack case that is greatly deformed may be formed so as to have a large thickness in order to secure the rigidity thereof, and a portion of the battery pack case that is not deformed may be formed so as to have a small thickness. As a result, the small thickness portion may be formed so as to have a smaller thickness than a conventional battery pack case. Consequently, it is possible to effectively prevent deformation of the battery pack case, to minimize an increase in weight of the battery pack case, and to provide a battery pack having increased capacity.

Those skilled in the art to which the present invention pertains will appreciate that various applications and modifications are possible within the category of the present invention based on the above description.

DESCRIPTION OF REFERENCE SYMBOLS

100, 200, 300, 400, 500, 600, 900: Battery pack cases
101: Battery cell
110, 210, 310, 410, 510, 610, 910: First cases
111, 211, 311, 411, 511, 811, 911: First flat panel portions
112, 212, 312, 412, 512, 812, 912: First side portions
120, 220, 320, 420, 520, 620, 920: Second cases
121, 221, 321, 421, 521, 621, 821, 921: Second flat panel portions
122, 222, 322, 422, 522, 622, 722, 822, 922: Second side portions
130: Battery cell stack
225, 325, 525, 825, 915, 925: Flange portions
423, 523, 623, 823: Stepped portions
627, 727: Vertical holes
728, 828, 928: Screw holes
741: Nut
742: Bolt
827: Horizontal hole D1: Thickness of second flat panel portion
D2: Thickness of second side portion
D3: Thickness of first flat panel portion
D4: Thickness of first side portion
P: Swelling direction of battery cell

The invention claimed is:

1. A battery pack case configured to receive a battery cell stack constituted by a plurality of battery cells stacked therein, the battery pack case comprising:
    a first case configured to allow the battery cell stack to be mounted therein; and
    a second case coupled to the first case, the second case being configured to cover the battery cell stack,
    wherein the first case comprises a first flat panel portion and a first side portion,
    wherein the second case comprises a second flat panel portion extending in a first direction and a second side portion extending in a second direction,
    wherein a thickness of the second flat panel portion of the second case is less than a thickness of the second side portion of the second case, and
    wherein a thickness of the second case in the first direction is greatest at an end portion of the second side portion contacting the first side portion.

2. The battery pack case according to claim 1, wherein the first case comprises two first side portions extending, in a direction perpendicular to the first flat panel portion, and from opposite outer peripheries of the first flat panel portion in a longitudinal direction thereof, and
    wherein the second case comprises two second side portions extending, in a direction perpendicular to the second flat panel portion, and from opposite outer peripheries of the second flat panel portion in a longitudinal direction thereof.

3. The battery pack case according to claim 2, wherein the second case comprises a flange portion being an end of each of the second side portions extending from the second flat panel portion and bent in a direction toward an outside of the second case, and
    wherein the flange portion is coupled to an end of a corresponding one of the first side portions of the first case.

4. The battery pack case according to claim 2, wherein a height of each of the second side portions is greater than a height of a corresponding one of the first side portions.

5. The battery pack case according to claim 1, wherein a thickness of the first flat panel portion of the first case is less than a thickness of each of first side portions of the first case.

6. The battery pack case according to claim 3, wherein the first case comprises a flange portion formed as a result of the end of each of the first side portions extending from the first flat panel portion being bent in a direction toward an outside of the first case,
    wherein a thickness of the first flat panel portion of the first case is less than a thickness of each of the first side portions of the first case, and
    wherein a screw hole is formed through the flange portion of the first case and the flange portion of the second case.

7. The battery pack case according to claim 1, wherein the second case includes a thermoplastic resin.

8. A battery pack comprising:
    the battery pack case according to claim 1,
    wherein the plurality of battery cells are received in the battery pack case, and wherein electrode plates of the plurality of battery cells are disposed so as to face first side portions and second side portions.

9. A battery pack case configured to receive a battery cell stack constituted by a plurality of battery cells stacked therein, the battery pack case comprising:
    a first case configured to allow the battery cell stack to be mounted therein; and
    a second case coupled to the first case, the second case being configured to cover the battery cell stack,
    wherein the first case comprises a first flat panel portion and a first side portion,
    wherein the second case comprises a second flat panel portion and a second side portion, portion,
    wherein a thickness of the second flat panel portion of the second case is less than a thickness of the second side portion of the second case, and
    wherein an outer second side portion protrudes further away from the plurality of battery cells than an outer surface of the first side portion.

10. The battery pack case according to claim 9, wherein the first case comprises two first side portions extending, in a direction perpendicular to the first flat panel portion, and from opposite outer peripheries of the first flat panel portion in a longitudinal direction thereof, and
    wherein the second case comprises two second side portions extending, in a direction perpendicular to the second flat panel portion, and from opposite outer peripheries of the second flat panel portion in a longitudinal direction thereof,
    wherein each of the second side portions is configured to have a structure including a step at an outer surface of the second side portion such that a thickness of an end thereof is reduced, and
    wherein the end of each of the second side portions is inserted into an inside of a corresponding one of the first side portions and a stepped portion of each of the second side portions having a large thickness is seated on an end of a corresponding one of the first side portions so as to be coupled thereto.

11. The battery pack case according to claim 10, wherein the stepped portion of each of the second side portions includes a vertical hole formed therethrough in a height direction thereof.

12. The battery pack case according to claim 11, wherein a screw hole is located under the vertical hole, the screw hole being configured such that an inner diameter of the screw hole is less than an inner diameter of the vertical hole and a height of the screw hole is less than a height of the vertical hole.

13. The battery pack case according to claim 10, wherein the stepped portion of each of the second side portions includes a horizontal hole formed therethrough in a horizontal direction thereof.

14. The battery pack case according to claim 9, wherein the second side portion includes a flange portion located at a lower portion of the second side portion, and
    wherein the flange portion contacts the first side portion on a first surface and a stepped portion of the second side portion located below the flange portion contacts the first side portion on a second side surface.

15. The battery pack case according to claim 1, wherein an end portion of the first side portion is a flat surface that contacts the flat surface of the second side portion.

16. The battery pack case according to claim 1, wherein a thickness of the second side portion above the end portion of the second side portion is approximately equal to a thickness of the first side portion contacting the end portion of the second side portion.

* * * * *